July 16, 1968
R. E. HINTZ
3,393,386
SEMICONDUCTING SHUNTS FOR STABILIZING
SUPERCONDUCTING MAGNET COILS
Filed Nov. 9, 1966
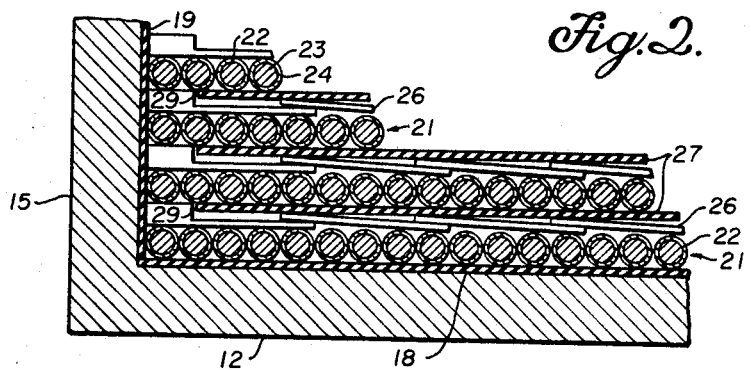
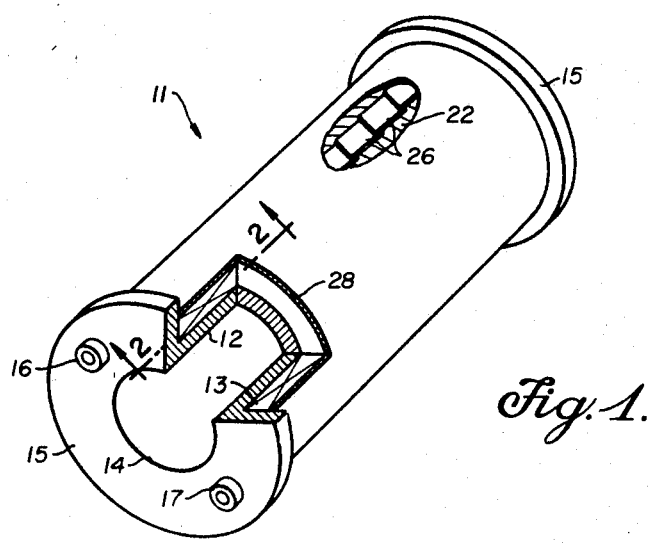
INVENTOR.
RONALD E. HINTZ
BY
ATTORNEY.

United States Patent Office 3,393,386
Patented July 16, 1968

3,393,386
SEMICONDUCTING SHUNTS FOR STABILIZING SUPERCONDUCTING MAGNET COILS
Ronald E. Hintz, Concord, Calif., assignor to the United States of America as represented by the United States Atomic Energy Commission
Filed Nov. 9, 1966, Ser. No. 593,601
1 Claim. (Cl. 335—216)

ABSTRACT OF THE DISCLOSURE

An improved superconducting coil in which semiconducting shunts contact each turn in the coil, the shunts providing alternate current paths when one or more turns go to normal conduction. The shunts are a series of oxidized copper wafers which act as insulators at superconducting temperatures, but readily conduct at higher temperatures.

---

The present invention relates to superconducting magnet coils and more specifically to means for avoiding heat generation in a superconducting magnet coil as a result of a portion thereof going to normal conduction, thereby reducing the possibility that the entire magnet will go to normal conduction. The invention described herein was made in the course of, or under, Contract W-7405-eng-48 with the United States Atomic Energy Commission.

In the design and construction of superconducting coils for magnets the general objectives include: approaching as closely as possible the critical current-carrying capacity of a short sample of the superconducting wire; the achievement of high current density to hold down coil size and amount of superconductive material required; and the provision of safe transitions from the superconducting state to the normal conduction state when the critical current capacity of the coil is exceeded. While many factors contribute to good superconducting coil design, a principal consideration is the provision of a thermal environment for the superconducting wire which is feasibly capable of removing the heat generated by magnetization losses and which is capable of avoiding the heat caused by power losses in the resistance of a portion of the magnet in the normal or partially normal conducting state. In the present invention, a superior thermal environment is obtained by providing alternate current paths which are effective only when the current capacity of the superconducting wire is reduced by heat generated as a result of magnetization losses.

In one type of conventional superconducting magnet, the magnet wire is formed of an inner core of superconductive material such as the alloy niobium-25% zirconium with a coating thereover of high conductivity normal type conductor such as copper, and having an outer covering of insulation. The conductive coating helps to maintain the superconductive material at a low temperature and provides a low electrical resistance by-pass when the current capacity of the superconductor is reduced as a result of heat generated by magnetization losses. A superconducting coil wound with this type of conductor can be constructed to approach the current-carrying capacity of the short sample standard by using about ten times more normal conducting metal in the coating than the superconducting material in the core. The disadvantgae of this construction is that current density is quite low. Typical current densities for superconducting coils of this type of design vary between 5,000 and 10,000 amperes per square centimeter of coil winding cross section. To avoid having such low current density, the majority of small superconducting magnet coils fabricated at present use wire that has only about half as much normal conducting metal coating as superconductor material and is covered with an organic insulation. However, the alternate current path is very restricted and the organic insulation interferes with heat transfer. These coils are particularly unstable and frequently operate at currents below half of the short sample current capacity of the wire. Typical current densities vary between 5,000 and 15,000 amperes per square centimeter depending on the size of the coil and the field intensity.

Still other experimental coils have been fabricated using bare copper clad over superconducting wire. In general these coils have higher current capacity than the organically insulated wire. However, many have required an unacceptable amount of time to energize, in some instances several hours, or have burned out in transitioning from the superconducting state to the normal state or both.

The present invention utilizes a novel coil construction in which semiconducting shunts are placed over each layer of copper clad superconducting wire. These shunts serve as efficient temporary detours for the current when the current capacity of the superconductor is temporarily exceeded. The current shunts prevent the coil from prematurely going normal at a relatively low current. Such premature transition often occurs in conventional coils as a result of uneven heating due to small variations in the coil construction, for instance, from unequal spacings between individual turns of wire. Thus, the current capacity of a coil, according to the present invention, is near the short sample current capacity rating of the superconductor material. Shunting of the wire is accomplished in the present invention without materially reducing the packing factor of the winding and therefore the attainment of high current densities is possible. For example, a current density of 30,000 amperes per square centimeter of coil winding cross section has been achieved in a two inch bore coil at a field of 46 kilogauss, utilizing a current of 46 amperes in a 0.010 inch diameter niobium-25% zirconium wire plated with copper to a 0.002 inch thickness. When the coil goes through the transition from the superconducting state to the normal state the shunts provide an alternate current path and prevent the build-up of high voltages which could otherwise be destructive.

Therefore, it is an object of this invention to provide greater stabilization for superconducting magnets.

It is a further object of the present invention to provide superconducting magnets having greater current-carrying capacity for a given size of superconductor wire.

It is still another object of this invention to provide superconducting magnets having a greater current-carrying capacity per square centimeter of cross sectional area of the coil winding.

It is a further important object of the present invention to protect the coil during a transition from the superconducting state to the normal conducting state by prevention of the build-up of high voltages.

The invention together with further objects and advantages thereof will be best understood by reference to the following specification in conjunction with the accompanying drawing of which:

FIGURE 1 is a partially broken-out perspective view of a superconducting coil, and FIGURE 2 is an enlarged cross-sectional view of a small portion of the coil taken along line 2—2 of FIGURE 1.

Referring now to the drawing, there is shown a superconducting magnet coil 11 having an inner coil form or spool 12 of copper, for example, and having a flange 15 at each end thereof. A bore 14 extends through the spool 12. A winding 13 is wound around the spool 13, the ends of the winding being connected to two terminals 16 and 17 provided at one end of spool 12. Referring now specifically to FIGURE 2, a layer of insulation 18 is disposed on the outer surface of spool 12 while the inner side of each end flange 15 of spool 12 is covered with insulation 19. A layer of wire 21 having individual turns 22 is wound over the layer of insulation 18. The wire is comprised of a central core 23 of superconducting material which may, for example, be 0.010 inch diameter niobium-25% zirconium alloy, and is provided with 0.002 inch thick copper plating 24. The insulation for wire 22 may be provided by the oxidation which normally occurs on copper since under superconducting conditions the voltage from one turn 22 to the next turn 22 is very small. As shown in both FIGURES 1 and 2, a series of thin overlapping oxidized copper wafers 26 which may range from .002 to .005 inch thick, is placed over each layer 21 in a row parallel to the axis of coil 11. While some oxidation will occur naturally, it will generally be desirable to increase the resistance of the oxidation by chemical means. A layer of insulation 27, which is preferably loosely woven glass wool cloth, is placed to cover the coil layer 21 and the row of wafers 26. Such loose insulation permits free flow of coolant within the coil. A small cutout 29 is provided in the insulation 27 directly over the last wafer in each line of wafers 26 to permit approximately one third of the area of such wafer to contact the next outer layer 21. Such cutout 29 is provided only between the electrically adjacent turns of two layers 21, that is, the end of the inner layer and the start of the outer layer. The end wafer may be shaped as necessary to obtain the desired electrical contact. Thus the shunting provided by the wafers 26 continues unbroken between layers 21. The balance of winding 13 is a repetition of such construction, wherein a row of wafers 26 is provided for each layer 21, both the layer 21 and wafers 26 being covered with insulation 27 until the total required number of layers 21 is obtained. In the placing of the rows of wafers 26 the locations are staggered around the circumference of winding 13 in order to prevent a number of rows piling up at one spot. For convenience, the two ends of the winding are brought out through the end flanges 15 of spool 12 and secured to the two terminals 16 and 17. A final covering 28 is placed over the winding 13 for protective purposes and over this covering a layer of stainless steel cable, not shown, may be placed where the magnetic forces so require.

In operation the coil is cooled to operating temperature by the use of liquid nitrogen and then liquid helium. The liquid penetrates the coil and the insulation 27 between the layers 21. When the coil 11 is down to operating temperature below the superconducting level, current is introduced into the coil through the terminals 16 and 17. When current increases through coil 11, there may be times when a turn 22 or a group of several turns may go to normal conduction. In this event there is some short circuiting from turn to turn through the copper coating. However this is greatly augmented by a shunting action of the wafers 26 where a wafer may shunt all of the turns 22 of a group that is going normal in conduction. Although the oxidation on the wafer 26 acts as an insualtor during superconduction, the oxide conducts when the turns go normal and this shunt action prevents the development of most of the heat that would otherwise be developed. This in turn will permit the particular turns 22 involved to be cooled and return to the superconducting condition.

It has been found that when superconducting coils built in accordance with the present invention are being charged, that is, when the current level is being increased to full capacity, any tendency for the coil 13 to go normal is indicated by a momentary decrease in the rate of current rise. In such instance, if the input voltage is lowered for a short interval, the superconducting condition is regained. The ability to check the tendency to go normal has not been found in conventional superconducting coils having a thin copper cladding over a superconductive core. Coils built in accordance with this invention have been brought up to full charge in two minutes.

Although the invention has been disclosed with respect to a single exemplary embodiment it will be evident to those skilled in the art that many variations are possible within the spirit and scope of the invention. Therefore it is not intended to limit the invention except as defined by the following claim.

What is claimed is:
1. In a superconducting magnet coil, the combination comprising a spool, a magnet wire of the class having a core of superconductive material coated with a relatively thin layer of copper, said wire being wound around said spool in at least one layer, a continuous semiconducting shunt disposed along each said layer of wire in contact with said conductive metal, said shunt being a plurality of mutually contacting wafers made of copper having a surface oxidized beyond the amount of oxidation normally occurring under atmospheric conditions, a loosely woven glass cloth insulation means disposed between each layer of wire with said contacting shunt and adjacent layers of said wire whereby said superconducting coil is stabilized from going to normal conduction and is protected from burn-out in the event current-carrying capacity of said coil is exceeded and the coil goes normal.

References Cited
UNITED STATES PATENTS 3,187,235   6/1965   Berlincourt et al. ____ 335—216
3,336,549   8/1967   Kafka et al. _____ 335—216

OTHER REFERENCES

Journal of Applied Physics, vol. 3, No. 12, December 1962, pages 3499–3503 relied on. QCIJ82 (an article by Riemersma et al.).

BERNARD A. GILHEANY, *Primary Examiner.*

G. HARRIS, *Assistant Examiner.*